United States Patent [19]

Eckhardt et al.

[11] 4,368,053

[45] Jan. 11, 1983

[54] FABRIC CONDITIONING COMPOSITIONS CONTAINING PHTHALOCYANINE SUBSTITUTED WITH QUATERNARY AMMONIUM GROUP-CONTAINING SULPHONAMIDE PHOTOACTIVATOR

[75] Inventors: Claude Eckhardt, Riedisheim; Gerd Hölzle, Liestal, both of Switzerland

[73] Assignee: Ciba-Geigy Corporation, Ardsley, N.Y.

[21] Appl. No.: 236,423

[22] Filed: Feb. 20, 1981

[30] Foreign Application Priority Data

Feb. 29, 1980 [CH] Switzerland .................... 1624/80

[51] Int. Cl.$^3$ ................................. D06L 3/00
[52] U.S. Cl. ..................................... 8/102; 8/101; 8/103; 252/94; 252/95; 252/102; 260/245.78
[58] Field of Search ................ 8/102, 103, 101; 260/314.5; 252/94, 95, 102

[56] References Cited

U.S. PATENT DOCUMENTS

| | | | |
|---|---|---|---|
| 3,927,967 | 12/1975 | Speakman | 252/95 |
| 4,033,718 | 7/1977 | Holcombe et al. | 8/103 |
| 4,094,806 | 1/1978 | Wiers | 252/102 |
| 4,166,718 | 9/1979 | Reinert et al. | 8/111 |
| 4,240,920 | 12/1980 | de Luque | 252/99 |
| 4,255,273 | 3/1981 | Sakkab | 252/102 |
| 4,256,597 | 3/1981 | Sakkab | 252/99 |

FOREIGN PATENT DOCUMENTS

| | | |
|---|---|---|
| 3149 | 7/1979 | European Pat. Off. . |
| 3371 | 8/1979 | European Pat. Off. . |
| 3861 | 9/1979 | European Pat. Off. . |
| 1372035 | 10/1974 | United Kingdom . |
| 1408144 | 10/1975 | United Kingdom . |

*Primary Examiner*—A. Lionel Clingman
*Attorney, Agent, or Firm*—Edward McC. Roberts

[57] ABSTRACT

The invention discloses fabric conditioning compositions which contain, as bleach photoactivator, an aluminium or zinc phthalocyanine which is substituted by cationic water-solubilizing groups, and also cationic fabric conditioners such as cationic surfactants, softeners, antistatic agents, fluorescent whitening agents and/or microbicides. The invention also provides a method of washing, rinsing and bleaching fabrics utilizing the compositions of the invention, as well as novel aluminium and zinc phthalocyanines which contain quaternary ammonium groups and ternary sulfonium groups as substituents.

25 Claims, No Drawings

FABRIC CONDITIONING COMPOSITIONS CONTAINING PHTHALOCYANINE SUBSTITUTED WITH QUATERNARY AMMONIUM GROUP-CONTAINING SULPHONAMIDE PHOTOACTIVATOR

The present invention relates to fabric conditioning compositions, especially detergent and aftertreating compositions, which contain a phthalocyanine bleach photoactivator, to a method of washing and bleaching textiles utilising said compositions, and to novel cationic zinc and aluminium phthalocyanines.

Methods of bleaching and removing stains from textiles with the aid of water-soluble phthalocyanines, especially metal-free or zinc phthalocyanines, and compositions for carrying out such methods, are known. Attention is drawn in this connection to the following publications: U.S Pat. Nos. 3,927,967, 4,094,806 and 4,033,718, and British Pat. Nos. 1 372 035 and 1 408 144. Similar methods and compositions containing water-soluble aluminium phthalocyanines are known from U.S Pat. No. 4,166,718. Published European Patent applications Nos. 3 149 and 3 861 concern washing and bleaching compositions which contain water-soluble porphines, including also phthalocyanines, as photoactivators, the compositions of the latter publication containing a peroxide bleaching agent as basic constituent. Finally, published European Patent application No. 3,371 teaches the use of bleaching compositions which contain a water-soluble photoactivator of the porphine series (including the phthalocyanine series), which compounds may contain anionic, non-ionic or cationic water-solubilising groups, as well as a cationic substance, e.g. a cationic surfactant, a cationic softener, or a cationic germicide.

It has now been found that, in detergent or aftertreating compositions (e.g. rinsing compositions) which contain cationic fabric conditioners, e.g. cationic surfactants, fabric softeners, antistatic agents, microbicides etc., and, as further component, a bleach photoactivator, it is particularly advantageous to use, as this latter, a water-soluble aluminium or zinc phthalocyanine which is substituted by cationic groups. Particularly good bleach effects are obtained with such compositions by treating textiles in an aqueous bath which contains these compounds and irradiating them in the bleaching bath itself or subsequently in the moist state with light in the visible and/or infra-red range. In addition, the compositions of this invention have the advantage that the action of the one basic component is not impaired by the other, i.e. that the bleaching action of the photoactivator is not impaired by the cationic fabric conditioner and vice versa, for example the action of the cationic surfactant or softener by the photoactivator.

Accordingly, the present invention provides fabric conditioning compositions containing a water-soluble aluminium or zinc phthalocyanine which is substituted by cationic groups as photoactivator, and one or more cationic fabric conditioners, as for example cationic surfactants, softeners, antistatic agents, fluorescent whitening agents and/or microbicides.

The water-soluble aluminium and zinc phthalocyanines in the compositions of this invention preferably contain, as water-solubilising substituents, radicals containing quaternary ammonium groups or ternary sulfonium groups, especially those radicals having a quaternary nitrogen atom.

In addition to containing the cationic water-solubilising groups, the zinc and aluminium phthalocyanines suitable for use in the compositions of the invention can also contain other substituents, e.g. anionic groups such as sulfo groups, carboxylic acid groups and the like, or/and non-ionic groups. Examples of such non-ionic groups are halogen atoms (including fluorine and iodine atoms), cyano, alkyl, alkoxy, optionally substituted phenyl, and other substituents common in phthalocyanine chemistry. Preferred substituents of this kind are fluorine, chlorine, bromine, iodine and cyano, with chlorine being preferred. The maximum number of these non-ionic substituents present in the molecule is such as not to cause the water-solubility to fall below the required level. However, only a very small amount of such substituents may be present, for example about 0.1 mole per mole of phthalocyanine compound.

Phthalocyanine derivatives which may be used with advantage as photoactivators in the compositions of the invention have the formula

or

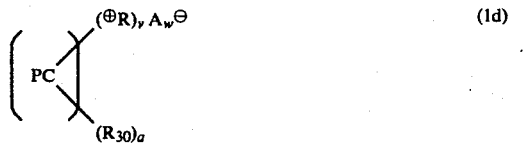

wherein PC is the unsubstituted zinc or aluminium phthalocyanine ring system, v is any number from 1 to 4, and $R^{\oplus}$ is a group of the formula

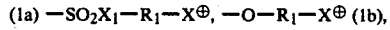

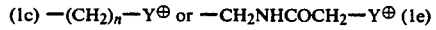

wherein n is 0 or 1, $R_1$ is unbranched or branched alkylene of 1 to 8 carbon atoms or 1,3- or 1,4-phenylene, $X_1$ is NH or N-alkyl, $X^{\oplus}$ is a group of the formula

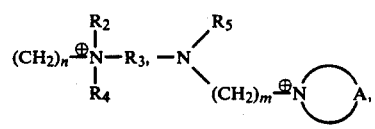

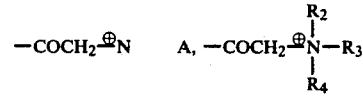

and, if $R_1$ is alkylene, also a group of the formula

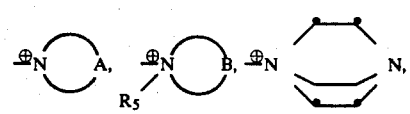

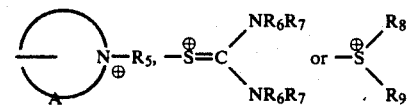

and $Y^{\oplus}$ is a group of the formula

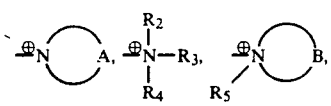 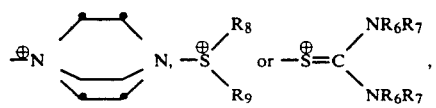

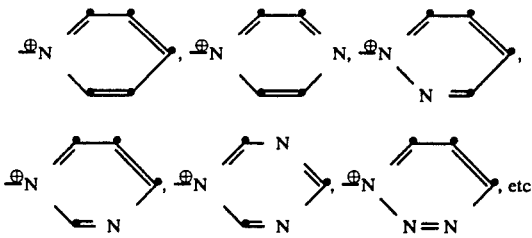

in which formulae above n is 0 or 1, each of $R_2$ and $R_3$ independently is unsubstituted or substituted $C_1$–$C_6$ alkyl, $R_4$ is unsubstituted or substituted $C_1$–$C_6$ alkyl, $C_3$–$C_7$ cycloalkyl or the $NR_6R_7$ group, $R_5$ is alkyl, each of $R_6$ and $R_7$ independently is hydrogen or unsubstituted or substituted alkyl, each of $R_8$ and $R_9$ independently is an unsubstituted or substituted alkyl or aralkyl radical, m is an integer from 1 to 6, A completes an aromatic 5- to 7-membered nitrogen-containing heterocyclic ring system which may contain one or two additional nitrogen atoms as ring members and which may carry different substituents, and B completes a saturated 5- or 7-membered nitrogen-containing heterocyclic ring system which may additionally contain 1 or 2 nitrogen, oxygen and/or sulfur atoms as ring members and which may carry different additional substituents, $R_{30}$ is a non-ionic substituent, a is any number from 0.1 to 4, and $A^\ominus$ is an inorganic or organic anion, w has the same value as v with respect to monovalent anions $A^\ominus$ and is $\leq v$ with respect to polyvalent anions, and $A_w^\ominus$ must balance the positive charge, with the proviso that, if v or a is $\neq 1$, the radicals $R^\oplus$ and/or $R_{30}$ can be the same or different, and that the phthalocyanine ring system can contain additional water-solubilising groups, e.g. anionic groups such a sulfo groups, and that all substituents are attached to the phenyl nuclei of the phthalocyanine ring system.

The number of the substituents R, which can be the same or different, is from 1 to 4 and, as is customary in phthalocyanine chemistry, must not be a whole number (degree of substitution). If other, non-ionic substituents are present, the sum of these latter and of the cationic substituents is from 1 to 8. How many substituents must at least be present in the molecule depends on the water solubility of the resultant molecule. The water-solubility is sufficient when enough phthalocyanine compound goes into solution in order to effect a photosensitising oxidation on the fabric. A solubility of 0.01 mg/l can be sufficient; but in general a solubility of 0.001 to 1 g/l is advantageous.

In the definitions of the substituents for formula (1), halogen denotes chlorine, bromine, fluorine or iodine, especially chlorine or bromine. Chlorine is preferred.

Preferred non-ionic substituents $R_{30}$ are fluorine, chlorine, bromine, iodine or cyano, especially chlorine. The integer a, which indicates the number of such substituents, can be any value from 0.1 to 4, preferably from 0.5 to 4.

Substituents of optionally substituted alkyl groups can be e.g. halogen, hydroxyl, cyano, phenyl, carboxyl, carbalkoxy or alkoxy. Suitable substituted alkyl groups are benzyl, phenethyl, hydroxyalkyl and cyanoalkyl. Cycloalkyl groups contain preferably 5 or 6 carbon atoms. Cyclohexyl is preferred.

Suitable aralkyl radicals are, in particular, alkyl radicals which are substituted by phenyl, naphthyl or pyridyl. The benzyl radical is preferred.

Suitable groups

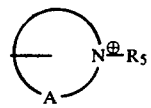 A are in particular:

[structures shown]

The group [structure] is preferred.

Suitable heterocyclic rings in the group

[structure with $N^\oplus$–$R_5$ and A]

are also those just indicated above, except only that the bond to the remaining part of the substituent is through a carbon atom.

In all substituents, phenyl, naphthyl and aromatic heterocyclic rings can be substituted by one or two further radicals, for example by alkyl, alkoxy, halogen, carboxyl, carbalkoxy, hydroxyl, amino, cyano, sulfo, sulfonamide etc. A preferred substituent is one selected from the group consisting of alkyl, alkoxy, halogen, carboxyl, carbalkoxy or hydroxyl.

The group

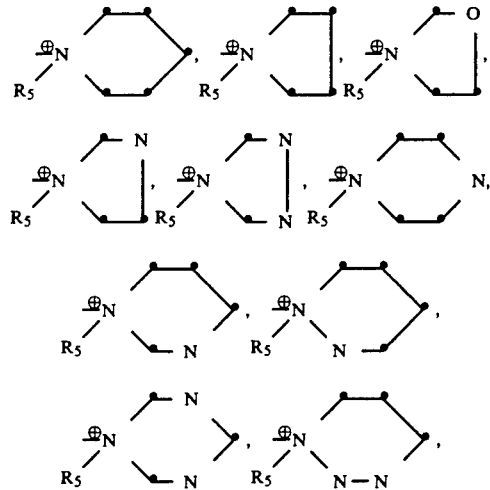

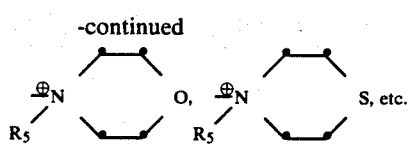

All the saturated nitrogen-containing heterocyclic rings indicated above can be additionally substituted by alkyl groups, either at one carbon atom or at a further nitrogen atom in the ring. The preferred alkyl group is the methyl group.

Preferred group of the above kind are those of the fromulae

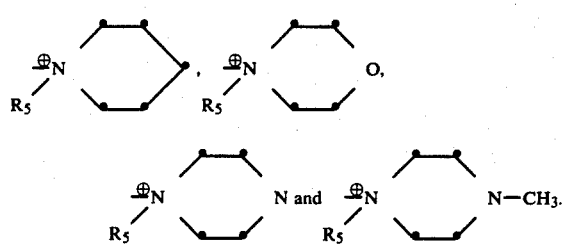

As counterion to the positive charge of the remaining part of the molecule, $A_w{}^\ominus$ is any anion. As a rule it is introduced by the preparatory process (quaternisation). It is then preferably a halogen ion (including $I^\ominus$), an alkylsulfate or an arylsulfonate ion. Examples of arylsulfonate ions are the benzenesulfonate, naphthalenesulfonate, p-tolylsulfonate and p-chlorophenylsulfonate ion. However, any other anion can also act as anion, as the anions can be easily exchanged in known manner. Accordingly, $A^\ominus$ can also be a sulfate, methylsulfate, sulfite, aminosulfonate, bicarbonate, carbonate, perchlorate, phosphate, nitrate, acetate, propionate, oxalate, maleate, citrate, lactate, succinate, chloroacetate, tartrate, malate, methanesulfonate or benzoate ion, or another anion of an organic carboxylic acid. The index w has the same value as v for monovalent anions, and has a smaller value than, or the same value as, v for polyvalent anions, but, depending on the conditions, must be of such a nature that it just balances the positive charge of the remaining part of the molecule.

In the substituents defined above, alkyl and alkoxy by themselves and as moieties of other substituents (e.g. carbalkoxy) preferably contain 1 to 6, most preferably 1 to 4, carbon atoms. The alkylene group $X_1$ preferably contains 2 to 6 carbon atoms, whilst m is preferably an integer from 2 to 4.

Preferred photoactivators to be used in the compositions of this invention are those of the formula

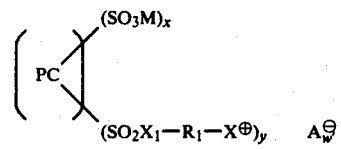

or

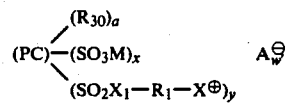

wherein PC, $X_1$, $X^\oplus$, $R_1$ and $A^\ominus$ are defined for formula (1) and $R_{30}$ and a are as defined for formula (1d), M is hydrogen, an alkali metal ion, an ammonium ion or an amine salt ion, and the sum of x and y is from 1 to 4, and $A_w{}^\ominus$ balances exactly the positive charge of the remaining part of the molecule; in particular, those of the formula $$(PC)\!\!-\!\!(SO_2NHR'_1\!-\!X'^\oplus A'^\ominus)_v \qquad (3)$$

or

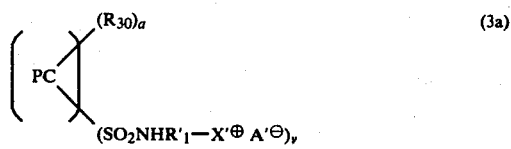

wherein PC is as defined for formula (1) and $R_{30}$ and a are as defined for formula (1a), $R'_1$ is $C_2$-$C_6$ alkylene, v is any number from 1 to 4, $X'^\oplus$ is a group of the formula

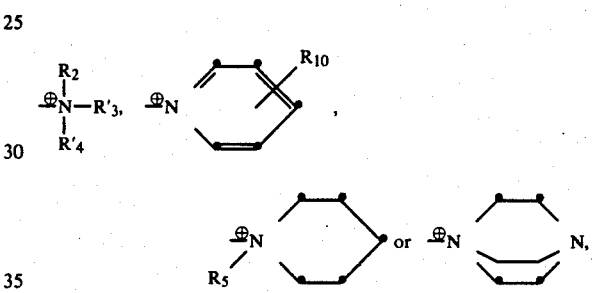

wherein each of $R_2$ and $R_3$ independently is $C_1$-$C_4$ alkyl which is unsubstituted or substituted by hydroxyl, cyano, halogen or phenyl, $R_4$ has the meaning of $R_2$ and can additionally be cyclohexyl or the amino group, $R_5$ is $C_1$-$C_4$ alkyl, $R_{10}$ is $C_1$-$C_4$ alkyl or $C_1$-$C_4$ alkoxy, halogen, carboxyl, carbalkoxy or hydroxyl, and $A'^\ominus$ is a halide, alkylsulfate or arylsulfonate ion, whilst the radicals $-SO_2NHR'_1-X^\oplus A^\ominus$ can be the same or different.

The compositions of the invention preferably contain the photoactivator in an amount of 0.0005 to 1.5% by weight, most referably 0.005 to 0.5% by weight, based on the total weight of the composition.

The second obligatory component of the compositions of this invention is a cationic fabric conditioner. Suitable fabric conditioners are, in particular, cationic surfactants, softeners, antistatic agents and/or microbicides. The compositions can also contain cationic fluorescent whitening agents. The cationic fabric conditioners recited above are known from the literature. For example, cationic fabric softeners and/or antistatic agents which can be used in the compositions of the invention are described in U.S. Pat. Nos. 3,756,950 and 3,904,533, German Offenlegungsschriften No. 2 855 519 and 2 920 453, Swiss Pat. No. 614 473, and in Japanese patent publication No. 42-15596.

Representative examples of useful cationic fabric softeners and/or antistatic agents are:

(1) Quaternary ammonium salts of the formula

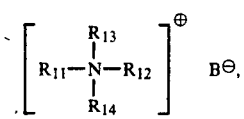 (4)

wherein $R_{11}$ is hydrogen or an aliphatic group containing 1 to 22 carbon atoms, $R_{12}$ is an aliphatic group containing 10 to 22 carbon atoms, each of $R_{13}$ and $R_{14}$ independently is $C_1-C_4$ alkyl, and $B^\ominus$ is an anion. Suitable anions $B^\ominus$ are the same as described above for $A^\ominus$ and $A'^\ominus$ in formulae (1) and (3).

Examples of quaternary ammonium fabric softeners are: tallyl trimethylammonium chloride, ditallyl dimethylammonium chloride, ditallyl dimethylammonium sulfate, dihexadecyl dimethylammonium chloride, dioctadecyl dimethylammonium chloride, dieicosyl dimethylammonium chloride, didocosyl dimethylammonium chloride, dihexadecyl diethylammonium chloride, dihexadecyl dimethylammonium acetate, ditallyl dipropylammonium phosphate, ditallyl dimethylammonium nitrate, dicocoyl dimethylammonium chloride.

(2) Quaternary imidazolinium salts of the formula

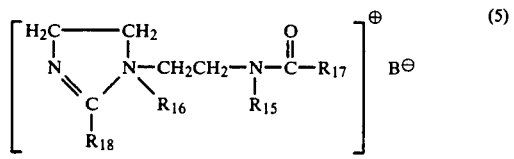 (5)

wherein $R_{15}$ is hydrogen or $C_1-C_4$ alkyl, $R_{16}$ is $C_1-C_4$ alkyl, $R_{17}$ is $C_1-C_{22}$ alkyl, $R_{18}$ is hydrogen or $C_1-C_{22}$ alkyl, preferably $C_{15}-C_{22}$ alkyl, and $B^\ominus$ is an anion. The anion $B^\ominus$ is as defined for formula (4).

Preferred compounds of the formula (5) are those wherein each of $R_{17}$ and $R_{18}$ is $C_{12}-C_2$ alkyl.

Examples of preferred imidazolinium compounds of the formula (5) are: 1-methyl-1-stearoylamidoethyl-2-heptadecyl-4,5-dihydroimidazolinium-methosulfate, 1-methyl-1-palmitoylamidoethyl-2-octadecyl-4,5-dihydroimidazolinium chloride, 2-tallyl-1-methyl-1-talloylamidoethyl-imidazolinium-methosulfate.

(3) Quaternary polyamide compounds of the formula

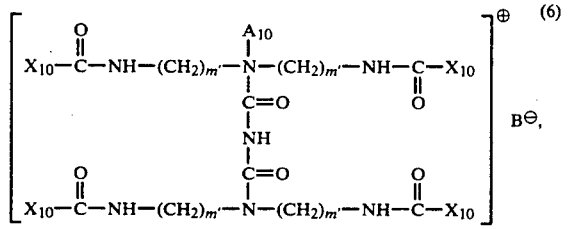 (6)

wherein $X_{10}$ is an unsubstituted or substituted, e.g. oxyalkylated, aliphatic hydrocarbon radical containing 10 to 30, preferably 12 to 22, carbon atoms, $A_{10}$ is dihydroxyalkyl containing at least 3 carbon atoms, preferably 3 to 8 carbon atoms, m' is an integer from 1 to 8, preferably 2 or 3, and $B^\ominus$ is a defined above.

$X_{10}$ is preferably derived from a fatty acid, e.g. from tallow fatty acid. $A_{10}$ is preferably the 2,3-dihydroxypropyl group.

(4) N-($C_{12}-C_{22}$)Alkylpyridinium chlorides.

(5) N,N-Dialkylmorpholinium chlorides, one alkyl moiety of which preferably contains 12 to 22 carbon atoms and the other 1 to 4 carbon atoms.

(6) Quaternised derivatives of amino acids and amino esters.

Representative examples of cationic surfactants are:

(1) Alkylated or acylated polyamines; reaction products of fatty acids containing about 10 to 20 carbon atoms with di- or olyamines such as ethylenediamine, propylenediamine, diethylenetriamine, triethylenetetramine, or with fatty amines or ethyleneimine such as stearyl N-($\beta$-aminoethyl)amide or N-oleyltriethylenetetramine; reaction products of alkyl halides containing 10 to 20 carbon atoms (e.g. dodecyl chloride, stearyl chloride) with polyalkylene polyamines (e.g. N-lauryldiethylenetriamine, N-octyl-tetraethylenetetramine, N-octadecyltriethylenetetramine, N-octadecyltrimethylenediamine; and adducts of 5 to 200 moles of ethylene oxide with alkylated or acylated di- or polyamines of the polyalkylene polyamine type, e.g. N-octadecyl-N,N', N"'-trioxyethyl-trimethylenediamine, adducts of 20 to 50 moles of ethylene oxide with hexadecylethylenediamine, octadecyldiethylenetriamine, octadecenylethylenediamine.

(2) The cationic surfactants described in published European patent applications 234 and 235.

(3) Preferred cationic surfactants have the formula

 (7)

wherein $R_{20}$ is a straight-chain or branched alkenyl or alkyl group of 8 to 22 carbon atoms, and each of the groups $R_{21}$, which can be the same or different, is alkyl or hydroxyalkyl of 1 to 4 carbon atoms or benzyl, with at most one group $R_{21}$ being benzyl. $B^\ominus$ is an anion and is as defined above. Examples of such compounds are palmityl trimethylammonium chloride and cocoyl trimethylammonium chloride.

(4) Further preferred cationic surfactants are imidazolinium compounds, especially those of the formula

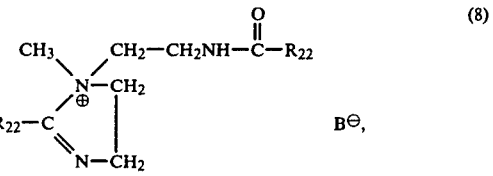 (8)

wherein $R_{22}$ is alkyl of 10 to 20, preferably 14 to 20, carbon atoms, and $B^\ominus$ is as defined above.

(5) Preferred cationic surfactants are also those of the formulae

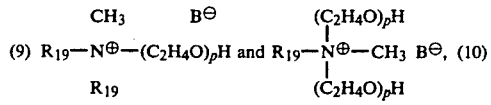

wherein $R_{19}$ is alkyl of 10 to 20 carbon atoms and p is an integer from 1 to 20, and $B^\ominus$ is an anion.

Cationic microbicides which are active against bacteria, fungi, algae, spores, viruses and also protozoa, are those known e.g. from U.S. Pat. Nos. 2,295,504, 2,479,850, 2,666,010, and 4,025,556. The cationic compounds described therein can be used in the compositions of the invention.

Preferred compounds of this kind are e.g. quaternary ammonium compounds of the formula

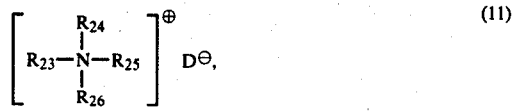

wherein $R_{23}$ is straight-chain or branched alkyl, aryl, aralkyl or alkylaryl, each of which is unsubstituted or substituted by halogen, hydroxyl, amino, alkylamino, dialkylamino, carbalkoxy or alkoxy, unsubstituted or alkyl-substituted heterocyclyl or alkyl substituted with a heterocyclus, which is saturated or unsaturated, $R_{24}$, $R_{25}$ and $R_{26}$, which are the same or different, are alkyl, aryl, aralkyl, alkylaryl, unsubstituted or alkyl-substituted heterocyclyl or alkyl substituted with a heterocyclus, which is saturated or unsaturated, and contain a total of 3 to 15 carbon atoms and the alkyl moieties of which (straight-chain or branched) are unsubstituted or substituted by halogen, hydroxyl, nitro, amino, alkylamino, dialkylamino, sulfonamido, carbalkoxy or alkoxy. $D^{\ominus}$ in formula (11) is an anionic water-solubilising group.

Preferred compounds of the formula (11) are those in which $R_{23}$ contains 12 to 20 carbon atoms, each of $R_{24}$ and $R_{25}$ independently is methyl or ethyl, $R_{26}$ is methyl, ethyl, benzyl or chlorobenzyl, and $D^{\ominus}$ is an inorganic anion such as a halide, nitrate, sulfate, hydroxide, methylsulfate, toluenesulfonate, carbonate and phosphate, or an organic anion such as acetate, propionate, benzoate, tartrate, citrate, salicylate, phenolate, tri- or pentachlorophenolate.

Examples of such cationic microbicides are: N-myristyl-N,N,N-trimethylammonium chloride, N-cetyl-N,N,N-triethylammonium bromide, N-oleyl-N-hexyl-N,N-dimethylammonium iodide, N-hydroxystearyl-N,N-diethyl-N-methylammonium sulfate, N-decylbenzyl-N,N,N-trimethylammonium propionate, N-benzyl-tetradecyl-N,N,N-triethylammonium salicylate, N-dodecylfuryl-N,N,N-trimethylammonium methosulfate, N-methoxypalmityl-N-thioazyl-N,N-dimethylammonium nitrate, N-lauryl-N,N-dimethyl-N-benzylammonium hydroxide, N-p-tert-octylphenoxyethoxyethyl-N,N-dimethyl-N-benzylammonium chloride, N-cetylaminophenyl-N,N,N-trimethylammonium methosulfate and N-cetyl-N,N-dimethyl-N-nitrobenzylammonium chloride.

It will be readily understood that the function of the cationic fabric conditioners specified above is not exclusively directed to one specific field of use. Many of these compounds and groups of compounds can perform two or more of the functions referred to (i.e. fabric softener, antistatic agent, microbicide, surfactant).

Depending on the method of use of the compositions of the invention, the amount of cationic fabric conditioner contained in the compositions, as well as the number and nature of the additional components contained therein, can vary within wide limits. The compositions of the invention can be e.g. aftertreating compositions such as rinsing compositions, detergent, soaking or pure bleaching compositions, if desired with microbicidal activity.

Aftertreating compositions, especially rinsing compositions, are usually liquid. The active compounds contained therein are preferably emulsified in water. In addition to water, photoactivator, cationic fabric conditioner, especially fabric softener and/or antistatic agent, these aftertreating compositions can contain small amounts of dye, perfume, protective agents, fluorescent whitening agents, buffer substances, viscosity regulators, emulsifiers, stabilisers, microbicides, corrosion inhibitors, shrink-resist agents etc. The consistency of the compositions can be stabilised or improved e.g. with urea, protonated oxyethylated alkylamines and/or with solvents such as lower alcohols, glycols and glycol ethers. Further, said rinsing compositions may additionally contain non-ionic fabric softeners and/or antistatic agents, for example sorbitol esters, fatty alcohols, mono- and diglycerides containing at least one free hydroxyl group, mono- and di-ether alcohols such as glycerol-1,3-distearyl ether, as well as diamines. The rinsing compositions of this invention can be prepared and applied in conventional manner.

Detergent compositions of the invention, which can be in liquid or solid form, contain, in addition to the photoactivator, one or more cationic fabric softeners, antistatic agents, surfactants and/or microbicides as essential component or components. If the detergent compositions are liquid, the cited components as well as further optional components (see below) are emulsified in water. The composition preferably contains the same additional components as the rinsing composition for stabilising the emulsion and obtaining an advantageous consistency. Solid (pulverulent) detergent compositions contain conventional builders, e.g. alkali polyphosphates and polymetaphosphates, alkali pyrophosphates, alkali silicates and carbonates and other inorganic salts. Generally, however, detergent compositions of this invention contain as few substances as possible which form free ions, as they have a detrimental effect on the cationic components. For this reason, liquid detergent compositions are preferred.

As optional components the detergent compositions can additionally contain further conventional detergent ingredients, in particular non-ionic surfactants. The non-ionic surfactants which are preferably employed in the detergent compositions of this invention are known and comprise water-soluble products which are derived from condensation products of an alkylene oxide or an equivalent reactant and a hydrophobic compound containing reactive hydrogen. The hydrophobic organic compounds can be aliphatic, aromatic or heterocyclic, although the first two classes of compound are preferred. Prefered hydrophobic compounds are the higher aliphatic alcohols and alkylphenols, although other compounds can also be used, e.g. carboxylic acids, carboxamides, mercaptans, sulfonamides etc. The ethylene oxide condensation products with higher aliphatic alcohols constitute a preferred class of non-ionic compounds. Usually the hydrophobic constituent should contain at least about 6, and preferably at least about 8, carbon atoms. It can even contain about 50 carbon atoms or more. The amount of the alkylene oxide varies considerably and depends on the hydrophobic compound. As a general rule about 5 moles at least of alkylene oxide should be used per mole of hydrophobic compound. The upper limit for the alkylene oxide also varies, but there is no critical limit for it. It is possible to use 200 moles or more of alkylene oxide per mole of hydrophobic compound. Although ethylene oxide is the preferred and principal oxyalkylating agent, it is also possible to use other lower alkylene oxides such as propylene oxide, butylene oxide and the like, or to replace the ethylene oxide partially.

Other suitable non-ionic compounds are the polyoxyalkylene esters of organic acids, as of higher fatty acids, resin acids, tall oil acids, acids of petroleum oxidation products etc. These esters usually contain about 10 to about 22 carbon atoms in the acid moiety and about 12 to about 30 moles of ethylene oxide or equivalent thereof.

Further non-ionic surface-active compounds are alkylene oxide condensation products with higher fatty acid amides. The fatty acid moiety contains generally about 8 to 22 carbon atoms and is condensed with about 10 to 50 moles of ethylene oxide. The corresponding carboxamides and sulfonamides can also be used as equivalents.

Preferred non-ionic surfactants are the oxyalkylated higher aliphatic alcohols. The fatty alcohols should contain at least 6, preferably at least 8, carbon atoms. Especially preferred alcohols are lauryl, myristyl, cetyl, stearyl and oleyl alcohol. These alcohols should be condensed with at least about 6 moles of ethylene oxide. A typical non-ionic product is an aliphatic alcohol which contains 12 to 13 carbon atoms and is condensed with about 6.5 moles of ethylene oxide. The corresponding alkylmercaptans which are condensed with ethylene oxide are also suitable.

The oxyalkylated higher aliphatic alcohols are particularly useful for detergent formulations employed in domestic washing machines, as they are easily degraded biologically and are compatible with cationic surfactants and fabric softeners as well as most other assistants.

The detergents of the invention may also contain anionic surfactants, for example soaps, soluble salts of sulfonic acid hemiesters of higher fatty alcohols and/or arylsulfonic acids polysubstituted by alkyl groups, sulfocarboxylates of medium to higher alcohols, fatty acid acylaminoalkylsulfonates or aminoaryl glycerol sulfonates, phosphoric acid esters of fatty alcohols etc. As, however, anionic components frequently cause the formation of insoluble compounds with the cationic compounds in the compositions of the invention, these latter should contain only insignificant amounts of anionic surfactant, as also of other customary detergent components which form free anions, as for example phosphates, silicates, polycarboxylates, borates, carboxymethyl cellulose etc.

The detergent compositions of the invention may also contain as further components: further bleaching agents such as chlorites, active chlorine donors, e.g. hypochlorites, chloroisocyanurates, especially dicloroisocyanurates, or per compounds such as hydrogen peroxide or hydrogen peroxide donors, alkali perborates, percarbonates, persulfates, persilicates, perphosphates and perpolyphosphates, organic peracids or salts and anhydrides thereof, urea peroxide etc.; bleach activators; soil suspending agents or soil redeposition inhibitors, e.g. polyvinyl alcohol, sodium carboxymethyl cellulose, hydroxypropylmethyl cellulose; foam regulators; corrosion inhibitors; dyes; fluorescent whitening agents; buffer substances; enzymes; enzyme stabilisers; perfumes.

A composition comprising the following components may serve to exemplify the formulation of a liquid detergent of this invention;

0.005–0.5% of photoactivator,

15–30% of a cationic fabric conditioner, provided it is not a fluorescent whitening agent,
40–70% of a non-ionic surfactant,
5–55% of solvent, preferably water, optionally together with lower monohydric or polyhydric alcohols and stabilisers as specified hereinabove,
0.01–10% of optional components as specified hereinabove, including e.g. about 0.01 to 2% of fluorescent whitening agent.

All percentages are by weight, based on the total weight of the finished detergent composition.

A dulling agent can also be added to the liquid detergents in order to impart a creamy appearance to them.

Preferred compositions of the invention have an alkaline pH value, for example from about 7 to 10. If the compositions themselves are acidic, the application bath can advantageously be made alkaline, e.g. to a pH value of 7 to 12, preferably 7.5 to 10, e.g. between 8 and 9. In principle, however, the application can also be made in the acid range.

As has been stated already, the compositions of the invention usually contain fluorescent whitening agents. Suitable fluorescent whitening agents are those customarily employed in fabric conditioners, preferably in detergents. Representative examples are the known anionic or non-ionic fluorescent whitening agents of the class of the bis-styrylbiphenyls, bis-triazinylaminostilbene-2,2'-disulfonic acids, naphthalimides, styryl- and stilbenylnaphthotriazoles, bis-triazolylstilbenes, 7-aminocoumarins, bis-benzoxazolylthiophenes, bis-benzoxazolylstilbenes and bis-benzoxazolylethylenes, bis-benzimidazolylstilbenes, bis-benzimidazolylethylenes and bis-benzimidazolylthiophenes, diphenylpyrazolines, styrylnaphthoxazoles, other benzoxazoles etc.

Most advantageously, however, the compositions of the invention contain a cationic fluorescent whitening agent. This can act direct as sole essential cationic fabric conditioner within the scope of the definition of claim 1. Preferably, however, the compositions of the invention contain such a cationic fluorescent whitening agent together with another cationic fabric conditioner (fabric softener, microbicide, antistatic agent and/or surfactant). Within the scope of the present invention, preferred cationic fluorescent whitening agents are those which are described in U.S. Pat. Nos. 3,940,417, 4,009,994, 4,151,163 and 4,147,648, in German Offenlegungsschriften 2 807 008 and 2 946 481, in British Pat. No. 2 023 605, in published European patent application Nos. 19702 and 19078, and in European patent application 80810324.6. Particularly advantageous for this purpose are the fluorescent whitening agents disclosed in published European patent application Nos. 19702 and 19078. Compositions of this invention preferably contain 0.001 to 3%, most preferably 0.01 to 2%, of one or more of the described fluorescent whitening agents, based on the total weight of the composition.

The compositions of the invention are applied in the manner conventionally employed for such compositions, except that the fabric treated with the compositions must be irradiated with light in order to activate the photoactivator fully. Reference is made in this connection to the method described in U.S. patent 4 166 718. For example, fabrics are washed in a liquor which contains a detergent composition of the invention. The irradiation with visible and/or infrared light can be effected direct in the bleaching bath, for example by means of a suitable artificial light source in the washing machine. It is preferred, however, to irradiate the fabric in the moist state after it has been removed from the wash bath, preferably using sunlight as light source. In this case, the fabric can be irradiated with advantage while drying. If the fabric is dried not on the line, but in a tumbler, it can also be irradiated during this drying process, for example by means of an artificial light source fitted to the tumbler. The presence of oxygen is also necessary to activate the photoactivator, for which purpose the oxygen present (dissolved) in the wash liquor (which should contain no reducing agent if possible) or atmospheric oxygen, if irradiation takes place outside the bath, suffices.

Especially good effects are obtained if the liquor in which the fabric is treated has an alkaline pH value, e.g. a value from 7 to 12, preferably from 7.5 to 10 or between 8 and 9. In principle, however, the application can also be carried out in the acid range.

The same method can be employed when using after-treating compositions, preferably rinsing compositions, for fabrics. In this method too the fabric is most expediently exposed to sunlight after being rinsed (e.g. after one or more rinses in the washing machine), in order to activate the photoactivator fully.

The action of the photoactivator facilitates the removal of stains from the treated fabric. In addition, the transfer of dye from one article to another can also thereby be prevented or diminished.

The present invention also provides novel phthalocyanines of the formula $$(PC)\!\!\!+\!\!\!(SO_2X_1\!-\!R_1\!-\!X^\oplus)_v \quad A_w^\ominus \quad (12)$$

and

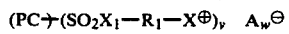     (12a)

wherein $R_{30}$ and a are as defined for formula (1d), PC is the unsubstituted zinc or aluminium phthalocyanine ring system, v is any number from 1 to 4, $R_1$ is branched or unbranched alkylene of 1 to 8 carbon atoms or 1,3- or 1,4-phenylene, $X_1$ is NH or N-alkyl, $X^\oplus$ is a group of the formula

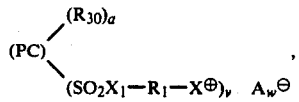

and, if $R_1$ is alkylene, also a group of the formula

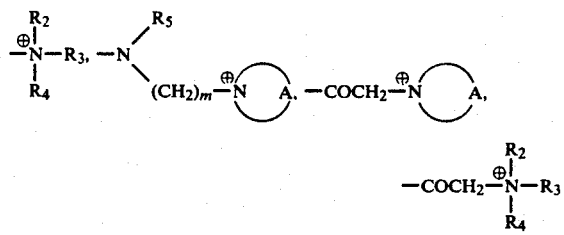

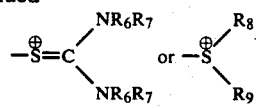

in which formulae each of $R_2$ and $R_3$ independently is unsubstituted or substituted $C_1$–$C_6$alkyl, $R_4$ is unsubstituted or substituted $C_1$–$C_6$alkyl, $C_3$–$C_7$cycloalkyl or the $NR_6R_7$ group, $R_5$ is alkyl, each of $R_6$ and $R_7$ independently is hydrogen or unsubstituted or substituted alkyl, each of $R_8$ and $R_9$ independently is an unsubstituted or substituted alkyl or aralkyl radical, m is an integer from 1 to 6, A completes an aromatic 5- to 7-membered nitrogen-containing heterocyclic ring system which may contain one or two additional nitrogen atoms as ring members and which may carry different substituents, and B completes a saturated 5- to 7-membered nitrogen-containing heterocyclic ring system which may additionally contain 1 or 2 nitrogen, oxygen and/or sulfur atoms as ring members and which may carry different additional substituents, and $A^\ominus$ is an inorganic or organic anion, w has the same value as v with respect to monovalent anions $A^\ominus$ and is $\leq v$ with respect to polyvalent anions, and $A_w^\ominus$ must balance the positive charge, with the proviso that, if v or a is $\neq 1$, the radicals R can be the same or different, and that the phthalocyanine ring system can contain additional water-solubilising groups, e.g. anionic groups such as sulfo groups, and that all substituents are attached to the phenyl nuclei of the phthalocyanine ring system.

The same definitions of the individual substituents apply here as initially set forth in respect of the compounds of the formula (1).

Within the scope of the compounds of the formulae (12) and (12a), compounds to be singled out for special mention are those of the formula (2) or (2a) as defined hereinabove. The phthalocyanine compounds of the formula (3) or (3a) also defined above are preferred.

The phthalocyanine compounds of the formulae (1) and (1d) contained in the compositions of this invention, and therefore also the novel compounds of the formulae (12) and (12a), can be obtained by methods which are known per se, especially by those which are commonly employed in phthalocyanine chemistry.

The water-solubilising cationic substituents can be introduced by starting from the unsubstituted phthalocyanine or a metal complex thereof. If the substitution is made at the metal-free phthalocyanine, or if the phthalocyanine ring system is formed from correspondingly substituted phthalic anhydride or phthalodinitrile, metallation can be carried out subsequently in known manner with a zinc or aluminium salt. The correspondingly substituted aluminium and zinc phthalocyanine complexes can, of course, also be obtained from other metal complexes by substitution of the respective metal by aluminium or zinc by known methods.

Compounds of the formula (1), wherein R denotes groups of the formula (1a), are obtained by reacting e.g. metal-free or already metallated phthalocyanine with chlorosulfonic acid to give the corresponding sulfochlorides. The resultant phthalocyanine sulfochlorides are then reacted, in known manner, with a diamine or a mercapto-amine of the formula

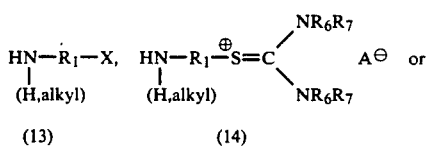

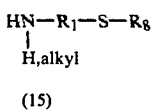

(15)

in which formulae $R_1$, $R_6$, $R_7$ and $R_8$ are as defined for formula (1), and X is a not yet quaternised tertiary amino group. In the phthalocyanine sulfonamides so obtained, the tertiary amino group X is quaternised, in known manner, to a group $X \oplus A \ominus$, or the mercapto group in formula (1) is ternated to the group

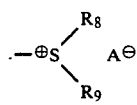

However, the phthalocyanine sulfochlorides can also be reacted, in known manner, with amines which already contain quaternary ammonium groups or ternary sulfonium groups (i.e. reaction with amines of the formula (13), wherein X is replaced by $X \oplus A \ominus$ or the sulfur atom in the amine of the formula (15) is already ternated).

A further method consists in reacting the phthalocyanine sulfochlorides with haloamines of the formula

and reacting the phthalocyanine sulfonamides so obtained e.g. with a tertiary amine. If it is desired to obtain compounds of the formula (2), the phthalocyanine sulfochlorides are reacted with less than stoichiometric amounts of amines of the formulae (13) to (16), and the remaining free $SO_2Cl$ groups, optionally after quaternisation, are hydrolysed to the sulfo groups or their salts.

Compounds of the formula (1) containing substituents of the formula (1c), wherein n is 1, can be obtained from the corresponding chloromethylated phthalocyanines by reacting these latter e.g. with a tertiary amine. Compounds of this kind, in which n is 0, can be obtained in similar manner from chlorinated phthalocyanines. Compounds of the formula (1) containing substituents of the formula (1b) can also be obtained from chlorinated phthalocyanines by reacting these with the corresponding tertiary amino-alcohols or -phenols, and subsequently quaternising the amino group.

Alternatively, the above compounds, also those containing substituents of the formula (1b), can be obtained by starting from a correspondingly substituted phthalodinitrile and condensing it, in known manner, to form the phthalocyanine ring system. If a substituted phthalodinitrile is used, it is cyclised in the melt or in solution or suspension, if desired together with a metal salt, to form the phthalocyanine ring system. If the corresponding phthalic anhydride is used, urea and, if desired, a catalyst, e.g. boric acid or ammonium molybdate, are added before the reaction.

In these latter methods just referred to, the quaternary ammonium groups or ternary sulfonium groups can be already present in the starting phthalic acid derivatives, or the corresponding tertiary amines or the corresponding mercaptans can be subsequently quaternised or ternated in the already formed phthalocyanine ring system.

If the substitution reactions described above are not carried out direct with the aluminium or zinc phthalocyanine complex, i.e. if the cyclisation reactions to form the phthalocyanine ring system are not carried out in the presence of an aluminium or zinc compound, then a correspondingly substituted metal-free phthalocyanine can be subsequently reacted with an aluminium or zinc salt or alcoholate in a solvent. Suitable solvents are, for example, mixtures of water and organic solvents, especially also tertiary amines or also anhydrous organic solvents, e.g. pyridine or chlorobenzenes.

The phthalocyanines which are used as photoactivators in the compositions of this invention, and which contain non-ionic substituents (e.g. compounds of the type of the formula (1d) or (12a)) in addition to the water-solubilising groups (especially the cationic groups) can also be obtained by conventional methods. For example, these non-ionic substituents can already be present in the starting materials used for the formation of the phthalocyanine ring structure (e.g. phthalic anhydride, phthalodinitrile or phthalodiimide). After the formation of the correspondingly substituted and, where appropriate, already metallated phthalocyanine, the water-solubilising groups can be introduced (see above and the Examples), provided these were not also already present in the starting materials. Many substituents can also be introduced into the already formed phthalocyanine ring system, e.g. by chlorination, bromination or iodination (e.g. where $R_{30}$ is Cl, Br, I). The water-solubilising substituents can be introduced beforehand or, preferably, subsequently (see above and the Examples). If the formation of the phthalocyanine ring system is carried out with phthalic anhydride or phthalodinitrile in the presence of a chloride, e.g. $AlCl_3$, $ZnCl_2$ etc., then already chlorinated phthalocyanines are obtained, especially those having a content of 0.5 mole to 1.5 moles of chlorine per mole of phthalocyanine. The cationic groups can also be introduced into such products subsequently (see above). To obtain phthalocyanine compounds containing mixed substituents it is possible to combine the methods described above in appropriate manner. All these methods are well known in phthalocyanine chemistry and are described exhaustively in the relevant literature.

The production of the photoactivators and compositions to be used in the practice of this invention are illustrated by the following Examples, in which parts and percentages are by weight. In these Examples, PC denotes the aluminium or zinc phthalocyanine ring system, PC' denotes the aluminium phthalocyanine ring system, and PC" denotes the zinc phthalocyanine ring system. All UV absorption maxima ($\lambda_{max}$) were measured in a mixture of ethanol/water (1:1) at pH 7.

EXAMPLE 1

0.1 mole of freshly prepared aluminium phthalocyanine trisulfochloride is suspended in 1000 parts of icewater and to this suspension is then added 1 mole of N,N-dimethylamino-3-aminopropane. The reaction mixture is stirred for 24 hours at room temperature and then for 4 hours at 60°–70° C. The suspension is filtered warm and the residue is washed with 1000 parts of warm water and dried in vacuo at 70°–80° C., affording the compound of the formula

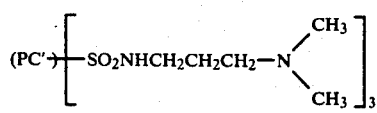 (100)

$\lambda_{max}$ = 678 nm

PC' denotes the radical of the unsubstituted aluminium phthalocyanine.

Quaternisation is effected by dissolving 3 g of the above compound in 50 ml of dimethyl formamide, adding 1 g of sodium bicarbonate and 2 ml of dimethyl sulfate, and stirring the mixture for 5 hours at 90° C. The reaction solution is evaporated to dryness in a rotary evaporator. The residue contains the readily water-soluble compound of the formula

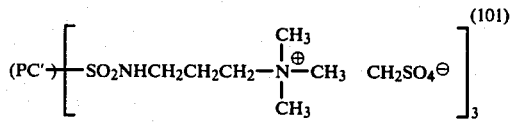 (101)

$\lambda_{max}$ = 677 nm

PC' denotes the radical of the unsubstituted aluminium phthalocyanine.

Repetition of the above procedure, substituting the amines of the formulae

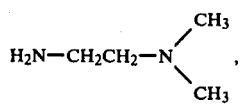,

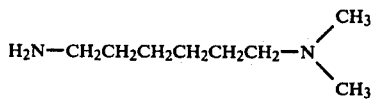,

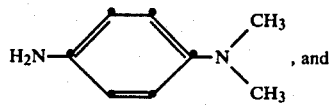, and

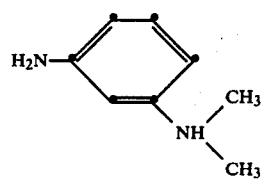

for N,N-dimethylamino-3-aminopropane, yields the products of the formulae (PC'─)─SO$_2$NHCH$_2$CH$_2$N$^\oplus$(CH$_3$)$_3$CH$_3$SO$_4$$^\ominus$]$_3$ (102)
$\lambda_{max}$ = 677/345 nm (PC'─)─SO$_2$NH(CH$_2$)$_6$─N$^\oplus$(CH$_3$)$_3$CH$_3$SO$_4$$^\ominus$]$_3$, (103)

 (104)

($\lambda_{max}$ = 676 nm) and

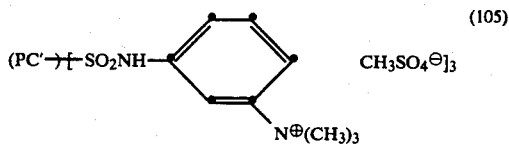 (105)

which have similarly good properties. Compounds in which PC' is replaced by the zinc phthalocyanine ring system are obtained by starting from the corresponding zinc phthalocyanine trisulfochloride and reacting it as described above. These products too have properties similar to those of the compounds described above. Aluminium or zinc phthalocyanine trisulfochloride can also be condensed in known manner with amines which already contain a quaternary ammonium group. Accordingly, it is possible to obtain e.g. the compounds of the formulae

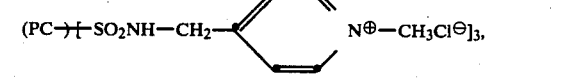 (106)

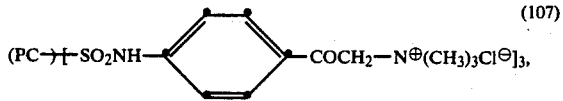 (107)

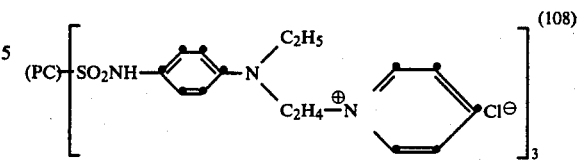 (108)

and

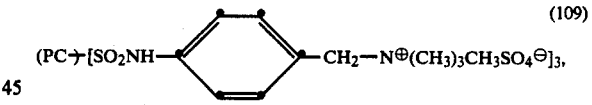 (109)

wherein PC is the unsubstituted zinc or aluminium phthalocyanine ring system, by reacting zinc or aluminium phthalocyanine trisulfochloride with the amines of the formulae

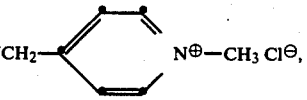

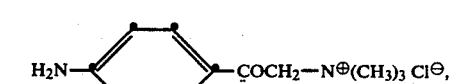

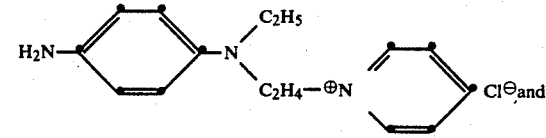 and

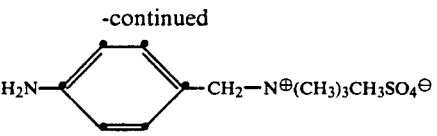

EXAMPLE 1a

The procedure of Example 1 is repeated, except that the starting aluminium phthalocyanine trisulfochloride is replaced by corresponding amounts of chloro-, bromo- or iodophthalocyanine trisulfochloride, to give the quaternised phthalocyanine compounds of Example 1 which contain chlorine, bromine or iodine atoms in addition to the quaternised substituents, for example the compound of the formula

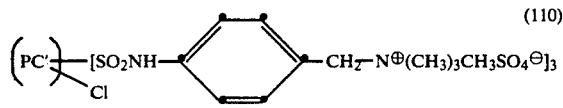   (110)

$\lambda_{max} = 676$ nm.

EXAMPLE 1b 25 parts of the compound of the formula

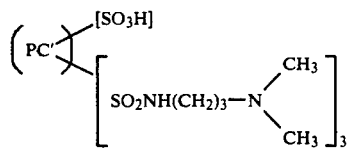   (111)

(PC' = radical of the unsubstituted aluminium phthalocyanine) are dissolved in 100 parts by volume of dimethyl formamide at 90° C. and to the solution are added 12 parts of dimethyl sulfate. The reaction mixture is stirred for 2 hours at 90° C., then diluted with 300 parts by volume of acetone. The precipitated product is collected by filtration, washed with acetone and dried, yielding 28 parts of the quaternised compound of the formula

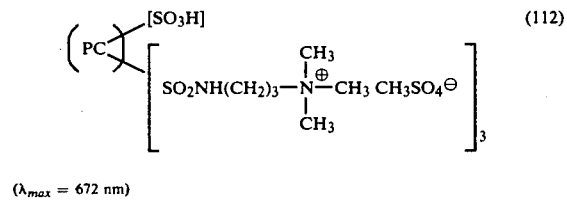   (112)

($\lambda_{max} = 672$ nm)

in the form of a blue powder.

By repeating the procedure of this Example, but using the compound of the formula

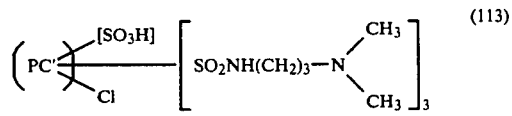   (113)

as starting material, the compound of the formula

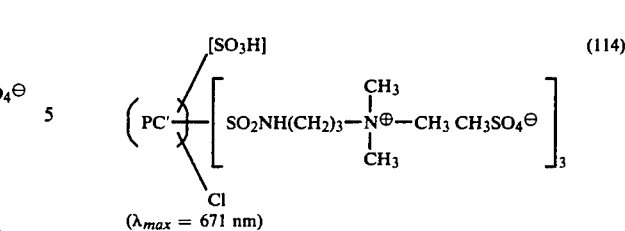   (114)

($\lambda_{max} = 671$ nm)

is also obtained as a blue powder.

EXAMPLE 2

0.01 Mole of the compound (PC'⁆–[SO₂NHCH₂CH₂—Cl]₄ (prepared by condensing 2-chloroethylamine with aluminium phthalocyanine tetrasulfochloride) is suspended in 100 ml of water. After addition of 20 ml of pyridine the reaction mixture is stirred at 70°–80° C. until the quaternisation is complete. The compound of the formula

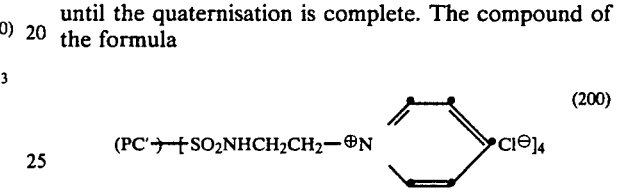   (200)

(PC' is as defined in Example 1) is precipitated with acetone, collected by filtration and dried. The above procedure is repeated, replacing pyridine by an equivalent amount of o-, m- or p-methylpyridine, p- or m-pyridinecarboxylic acid, trimethylamine, triethylamine, triethanolamine, dimethylethanolamine, quinuclidine, N-methylcyclohexane, dimethylcyclohexylamine, N,N-dimethylhydrazine, thiourea or tetramethylurea, to give the compounds of the formulae:

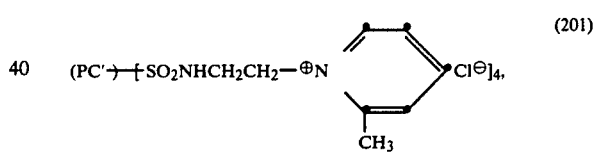   (201)

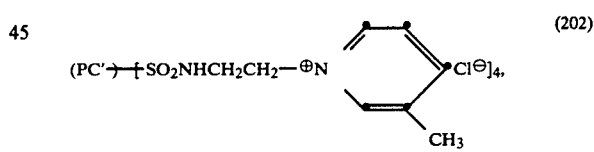   (202)

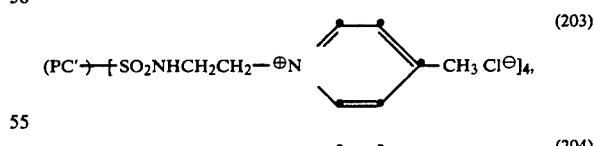   (203)

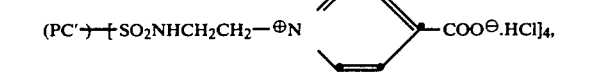   (204)

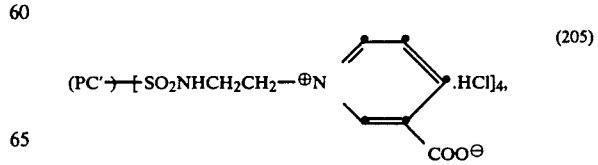   (205)

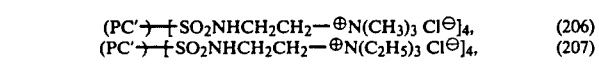   (206)
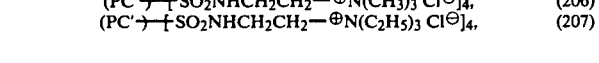   (207)

-continued

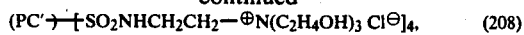 (208)

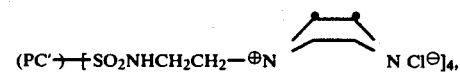 (209)

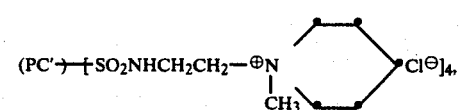 (210)

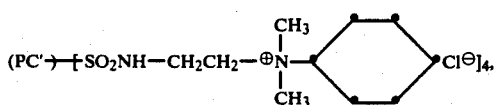 (211)

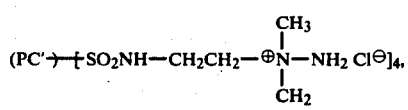 (212)

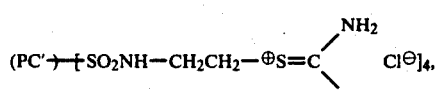 (213)

(PC'⟩⟩—SO₂NH—CH₂CH₂—⊕S=C(NH₂)(NH₂) Cl⊖]₄, (214)

(PC'⟩⟩—SO₂NH—CH₂CH₂—⊕S=C(N(CH₃)₂)(N(CH₃)₂) Cl⊖]₄ (215)

and

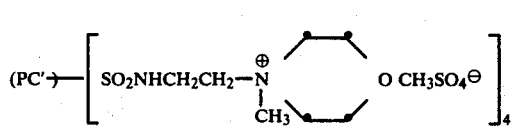 (216)

$\lambda_{max}$ = 675 nm

Compound (216) is obtained by reaction with morpholine and subsequent quaternisation with dimethyl sulfate. (PC'=unsubstituted aluminium phthalocyanine ring system).

EXAMPLE 2a

Example 2 is repeated, except that the starting compound of the formula (PC'⟩⟩—[SO₂NHCH₂CH₂Cl]₄ is replaced by corresponding amounts of compounds of the formula

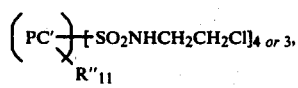

wherein R''₁₁ is chlorine, bromine or iodine, to give the quaternised compounds of Example 2 which contain chlorine, bromine or iodine atoms in addition to the quaternised substituents, for example the compounds of the formulae

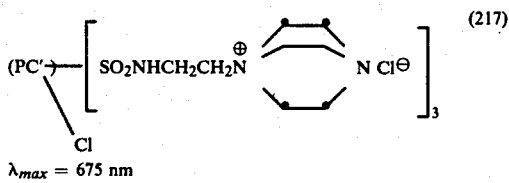 (217)

$\lambda_{max}$ = 675 nm and

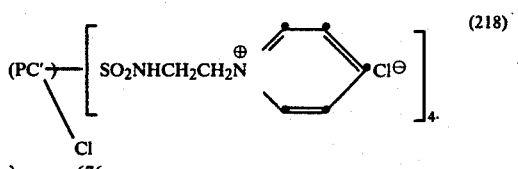 (218)

$\lambda_{max}$ = 676 nm

EXAMPLE 3

The compound of the formula

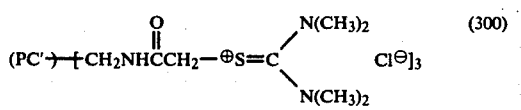 (300)

is prepared in accordance with the particulars of Example 3 of British Pat. No. 806 175, starting from aluminium phthalocyanine. This compound also has very good properties as photoactivator. (PC'=unsubstituted aluminium phthalocyanine ring system).

The following compounds are obtained in similar manner:

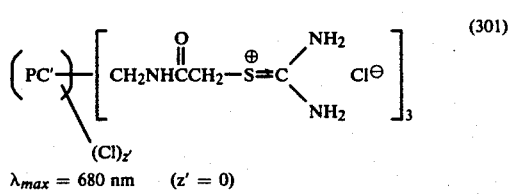 (301)

$\lambda_{max}$ = 680 nm   (z' = 0)

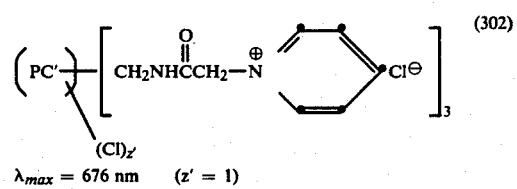 (302)

$\lambda_{max}$ = 676 nm   (z' = 1)

z' in formulae (301) and (302) is 0 or 1. The starting material is a compound of the formula

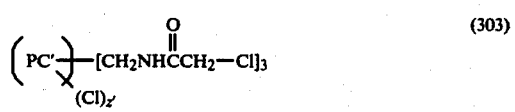 (303)

EXAMPLE 4

10 Parts of tris-chloromethyl aluminium phthalocyanine are stirred in 60 parts of pyridine for 15 hours at 90°–95° C. The pyridine compound of the formula

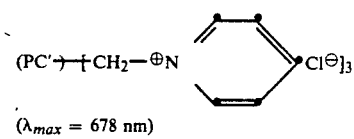

(400)

($\lambda_{max}$ = 678 nm)

is precipitated with acetone, collected by filtration, washed with acetone and dried. (PC'=unsubstituted aluminium phthalocyanine ring system).

The following compounds are obtained as described above, starting from tris-chloromethyl aluminium phthalocyanine:

(a) the compound of the formula

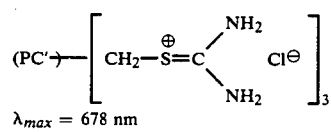

(401)

$\lambda_{max}$ = 678 nm by reacting tris-chloromethyl aluminium phthalocyanine in a thiourea melt at 100° C.;

(b) the compound of the formula

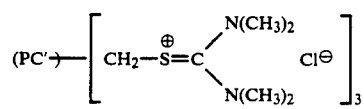

(402)

by fusing tris-chloromethyl aluminium phthalocyanine with tetramethylurea;

(c) the compound of the formula

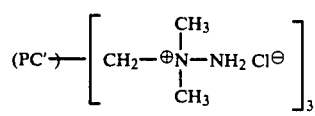

(403)

by reacting tris-chloromethyl aluminium phthalocyanine with anhydrous N,N-dimethylhydrazine at 60° C.;

(d) the compound of the formula

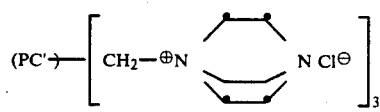

(404)

by heating tris-chloromethyl aluminium phthalocyanine in a 25% aqueous solution of diazabicyclooctane to 100° C.;

(e) the compound of the formula

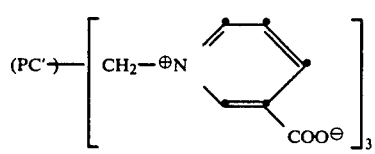

(405)

by condensing tris-chloromethyl aluminium phthalocyanine with nicotinic acid in dimethyl formamide at 110°-115° C.;

(f) the compound of the formula

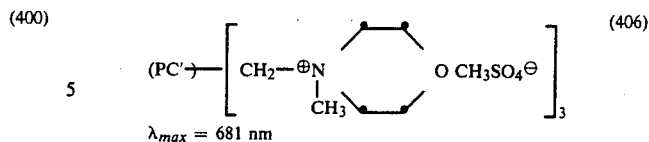

(406)

$\lambda_{max}$ = 681 nm by condensing tris-chloromethyl aluminium phthalocyanine with morpholine and then quaternising the condensation product with dimethyl sulfate;

(g) the compound of the formula

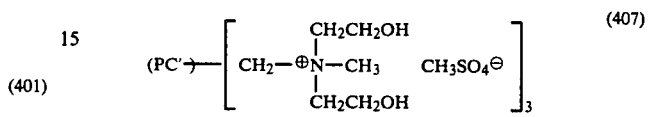

(407)

by reacting tris-chloromethyl aluminium phthalocyanine with diethanolamine and then quaternising the reaction product with dimethyl sulfate.

If a tris-chloromethyl aluminium phthalocyanine which is substituted in the nucleus by chlorine, bromine or iodine is used as starting material in the above procedures instead of an unsubstituted tris-chloromethyl aluminium phthalocyanine, then there are obtained the corresponding compounds which contain chlorine, bromine or iodine atoms in addition to the quaternised substituents, for example compounds of the formulae

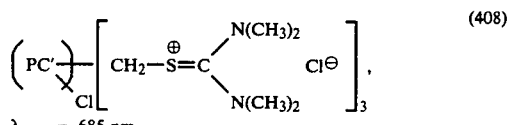

(408)

$\lambda_{max}$ = 685 nm

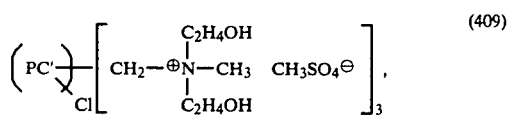

(409)

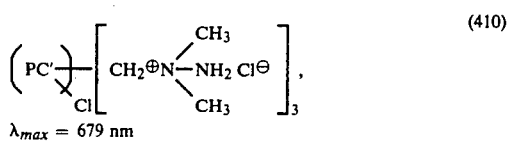

(410)

$\lambda_{max}$ = 679 nm

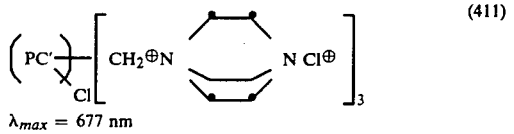

(411)

$\lambda_{max}$ = 677 nm and

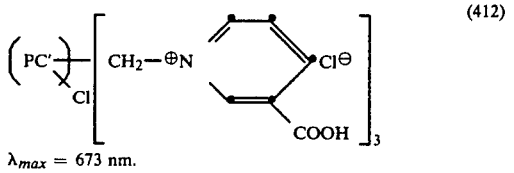

(412)

$\lambda_{max}$ = 673 nm.

If a corresponding zinc complex is used instead of an optionally chlorine-, bromine- or iodine-substituted tris-chloromethyl aluminium phthalocyanine, there are obtained the corresponding zinc phthalocyanines with similarly good properties, for example the compound of the formula

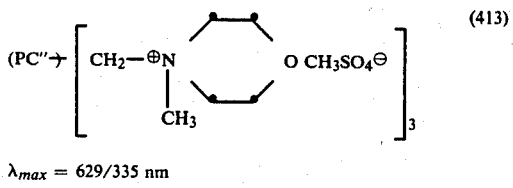

$\lambda_{max} = 629/335$ nm (PC″ = zinc phthalocyanine ring structure)

EXAMPLE 5

10 Parts of the compound of the formula (100) are suspended in 50 parts by volume of dimethyl methanephosphonate and the suspension is stirred for 3 hours at 90°–95° C. The reaction mass is evaporated to dryness in vacuo. The residue is taken up in 200 parts of water and the solution is neutralised with dilute sodium hydroxide and evaporated to dryness in vacuo, affording 16 parts of a blue powder which contains the compound of the formula

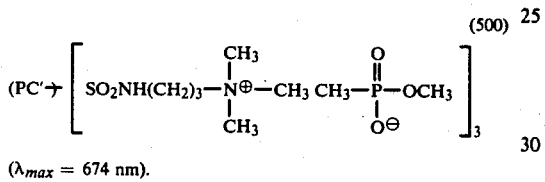

($\lambda_{max} = 674$ nm).

The anions of the compounds prepared in Examples 1 to 5 can either be replaced by other anions by conventional methods or other anions can be introduced by suitable quaternising agents. The compounds obtained in Examples 1 to 5 can also contain e.g. the following anions: $Br^{\ominus}$, $I^{\ominus}$, alkylsulfates other than methyl sulfate, sulfate, aminosulfate, perchlorate, benzenesulfonate, naphthalenesulfonate, p-tolylsulfonate, p-chlorophenylsulfonate, sulfite, carbonate, bicarbonate, phosphate, nitrate, acetate, propionate, oxalate, maleate, malate, citrate, lactate, succinate, chloroacetate, tartrate, methanesulfonate, benzoate etc.

EXAMPLE 6

Liquid cationic detergent formulation with photobleaching action. Application in the steeping method.

Detergent Formulation

60% of a $C_{12}$–$C_{13}$ fatty alcohol oxyethylated with 6.5 moles of ethylene oxide,
26.7% of 1-methyl-1-oleylamidoethyl-2-oleylimidazolinium methosulfate (75% of active ingredient),
0.4% of blue dye (Polar Brilliant Blue, 0.5% solution),
1% of perfume,
(a) 0%, (b) 0.004%, (c) 0.01% of the photoactivator of the formula $(PC'\rightarrow[SO_2NHCH_2CH_2^{\oplus}-N(CH_3)_3 \ CH_3SO_4^{\ominus}]_3$ water to make up 100%.

Steeping Method 0.5 g of bleached cotton fabric which had been stained with a brown dye in accordance with Example 9 of U.S. Pat. No. 4,166,718, is steeped together with 9.5 g of a non-soiled bleached cotton fabric for 2 hours at 40° C. in 300 ml of water which contains 1.5 g/l of the above detergent [3 batches containing photoactivator in the respective amounts of (a), (b) and (c)], with the test fabric (0.5 g) being laid on the topmost layer of the ballast fabric (9.5 g). The steeping bath is irradiated with a 200 watt light bulb, the lowest point of which is 10 cm above the surface of the bath.

After the treatment, the pieces of fabric are rinsed for 30 seconds under running water, centrifuged, and ironed at 150° C. The brightness values of the test strips are then measured with the G filter of a Zeiss "Elrepho" filter-spectrophotometer. The differences in the brightness values ($\Delta Y$) of the test strips treated with the detergents containing photoactivator [batches (b) and (c)] and those of the strips treated with detergent that does not contain photoactivator [batch (a)] are determined. They serve as reference value for assessing the degree of stain removal effected by the photoactivator. Measured differences in brightness ($\Delta Y$):

(b) detergent containing 0.004% of photoactivator: $\Delta Y = 6.7$ (c) detergent containing 0.01% of photoactivator: $\Delta Y = 10.6$

EXAMPLE 7

For comparison purposes Example 6 is repeated, except that
1. sulfonated zinc phthalocyanine,
2. sulfonated aluminium phthalicyanine, and
3. low sulfonated aluminium phthalocyanine,
are added, as photoactivator, to the detergent.

These three substances, also in a concentration of 0.01%, exert no visible bleaching effect on the test strips ($\Delta Y$ within the limits of error). Even when the compounds 1, 2 and 3 are used in 10 times higher concentrations, the values obtained of $\Delta Y$ are less than 1.

EXAMPLE 8

Detergent formulation as in Example 6; application by washing and irradiating the textiles with light outside the bath.

Cotton fabric stained with a brown dye (see Example 6) is washed in conventional manner for 20 minutes at 40° C., in a liquor ratio of 1:30, in a bath which is not irradiated and which contains 1.5 g/l of the detergent composition described in Example 6 (3 batches having, respectively, a photoactivator content of 0, 0.004 and 0.01%). The washed strips of fabric are centrifuged briefly and hung moist on a line in daylight. The strips are left hanging on the line until an exposure of 200 langleys is attained. In order to prevent the strips of fabric from drying too rapidly in contrast to actual practice, they are moistened again after 2 hours by spraying them with a phosphate buffer solution (pH 9). The brightness values and the differences in the brightness values are determined as described in Example 6. Excellent bleaching effects are observed:

batch (b) containing 0.004% of photoactivator gives a $\Delta Y$ value of 3.7,
batch (c) containing 0.01% of photoactivator gives a $\Delta Y$ value of 21.1.

The procedure of this Example is repeated, except that the phthalocyanine compound of the formula

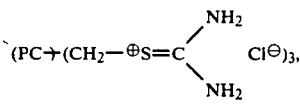

(PC = the aluminium or zinc phthalocyanine ring structure) is used as photoactivator in corresponding amounts. The bleaching effects are as good as those obtained with the photoactivator described in Example 1.

EXAMPLE 9

Example 8 is repeated for comparison purposes, but using the same anionic photoactivators as in Example 7. Scarcely any visible bleaching effect is achieved with these anionic or weakly anionic compounds in the concentrations in which the cationic photoactivator is used. Only when very much higher concentrations are used is it possible to observe insignificant effects, e.g.:

|  | $\Delta Y$ |
| --- | --- |
| 0.1% of sulfonated zinc phthalocyanine | 2.5 |
| 0.1% of sulfonated aluminium phthalocyanine | 4.9 |
| 0.1% of low sulfonated aluminium phthalocyanine | 3.8 to 4.1 |

EXAMPLE 10

Fabric Softener Formulation

A fabric softening composition is formulated as follows: With constant stirring, 93 parts of deionised water of 60° C. are added dropwise to a melt of 7 parts of distearyl dimethylammonium chloride (75%). Then 0.03% of the photoactivator of Example 6 is added. A comparison formulation is prepared without photoactivator.

After it has cooled, the fabric softener is used for rinsing cotton fabric stained with a brown dye (see Example 6). The procedure is as follows: The pieces of fabric are rinsed for 20 minutes at 25° C., in a liquor ratio of 1:20, in a liquor which contains 2 g/l of the above fabric softener formulation. The fabric strips are centrifuged, then hung moist on a line and exposed to 200 langleys as described in Example 8.

The measurement of the brightness and difference in brightness as reference value for assessing the degree of bleaching is made as described in Example 6. Compared with fabric that has been treated with a rinsing liquor without photoactivator, a marked bleaching effect is obtained on the test fabric treated with the rinsing liquor which contains photoactivator. The difference in brightness $\Delta Y$ is 4.8 (at a photoactivator concentration of 0.03% in the fabric softener).

EXAMPLE 11

The sulfonated phthalocyanine derivatives employed in Example 7 are used again for purposes of comparison. By repeating the procedure of Example 10, but with a fabric softener rinsing composition containing the above compounds (0.03%), it is not possible to detect any bleaching effect on the test fabric. Even using increased concentrations (approx. 0.1%) of these anionic photoactivators, bleaching effects ($\Delta Y$) of only less than 1 are obtained.

EXAMPLE 12

Example 10 is repeated, but using 1-methyl-1-talloyl-amidoethyl-2-tallyl-imidazolinium methosulfate as fabric softener (the content of photoactivator remaining the same at 0.03%). A distinct bleaching effect, namely of $\Delta Y = 5.3$, is again obtained in this case.

EXAMPLE 13

1 g samples of bleached cotton fabric which have been stained with a brown dye in accordance with Example 9 of U.S. Pat. No. 4,166,718, are treated for 1 hour at 50° C., with stirring and while irradiating with a 250 watt infra-red lamp (distance from the surface of the bath: 15 cm) in a liquor which has been adjusted to a pH value of 8 to 9 with sodium tripolyphosphate and which contains 2 g/l of a detergent of the following composition:

55 parts of water
15 parts of ethanol
2 parts of citric acid
20 parts of an oxyethylated fatty amine
8 parts of a 75% dialkyl dimethylammonium chloride (alkyl groups: 24 parts of palmityl, 75 parts of stearyl, 1 part of oleyl)
and 0 or 0.0075%, based on the weight of the test fabric, of the photoactivator of the formula

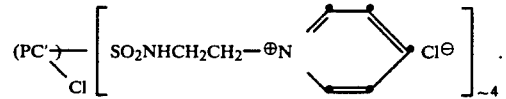

The samples of fabric are afterwards rinsed, dried and ironed. The brightness values are then determined as described in Example 6. The differences in the brightness values ($\Delta Y$) of the two test fabrics (one washed with detergent containing photoactivator and the other without photoactivator) are determined:

at pH 8 of the wash bath, the $\Delta Y$ was 9.8
at pH 9 of the wash bath, the $\Delta Y$ was 20.2.

The above described wash procedure is repeated with a number of other photoactivators listed in the following table. The differences in the brightness values ($\Delta Y$) are also reported in the table.

TABLE

| Photoactivator | $\Delta Y$ pH = 8 | $\Delta Y$ pH = 9 |
| --- | --- | --- |
| $(PC' \!\!+\!\! [SO_2NH-(CH_2)_3 \overset{\oplus}{N}(CH_3)_3 \; CH_3SO_4^{\ominus}]_3$ | 15.4 | 25.1 |
| $(PC' \!\!+\!\! [SO_2NH-(CH_2)_2 \overset{\oplus}{N}(CH_3)_3 \; CH_3SO_4^{\ominus}]_3$ | 15.8 | 23.6 |
| $(PC' \!\!+\!\! [CH_2-\overset{\oplus}{N}\underset{CH_3}{\diagup}\!\!\diagdown O \; CH_3SO_4^{\ominus}]_3$ | 3.0 | 6.3 |
| $(PC' \overset{[SO_3H]}{\underset{Cl}{\diagup}}\!\!\!+\!\![SO_2NH(CH_2)_3 \overset{\oplus}{N}(CH_3)_3 \; CH_3SO_4^{\ominus}]_3$ | 11.3 | 19.2 |

TABLE-continued

| Photoactivator | ΔY pH = 8 | pH = 9 |
|---|---|---|
|  | 9.8 | 20.2 |
| 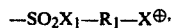 | 16.9 | 19.9 |

The wash procedure described in this Example is repeated, using in each case one of the compounds of the formulae (103)–(110), (112), (200)–(217), (300)–(302), (400)–(405) and (407)–(413) as photoactivator. Test fabrics with similarly good brightness values are also obtained.

What is claimed is:

1. A fabric conditioning composition containing an aluminium or zinc phthalocyanine as bleach photoactivator which is substituted by a cationic water-solubilising group, and one or more cationic fabric conditioners.

2. A composition of claim 1, wherein the aluminium or zinc phthalocyanine contains a quaternary ammonium group and a ternary sulfonium group.

3. A composition of either of claims 1 or 2, wherein the aluminum or zinc phthalocyanine further contains one or more of an anionic group and a non-ionic group.

4. A composition of claim 2 which contains a phthalocyanine of the formula $$(PC)\!\!-\!\!(\oplus R)_v\, A^\ominus{}_w$$

wherein PC is the unsubstituted zinc or aluminium phthalocyanine ring system, v is a number from 1 to 4 and ⊕R is a group of the formula

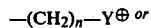

—(CH$_2$)$_n$—Y⊕ or

—CH$_2$NHCOCH$_2$—Y⊕ wherein n is 0 or 1, R$_1$ is unbranched or branched alkylene of 1 to 8 carbon atoms or 1,3- or 1,4-phenylene, X$_1$ is NH or N-alkyl, X⊕ is a group of the formula

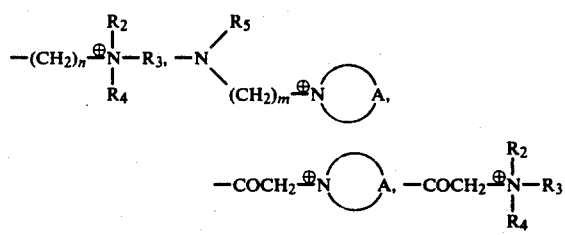

and, if R$_1$ is alkylene, is also a group of the formula

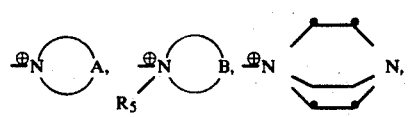

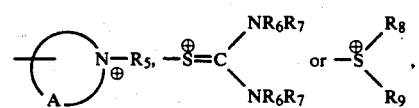

Y⊕ is a group of the formula

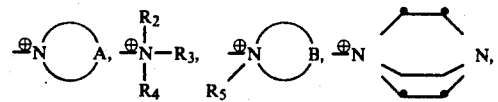

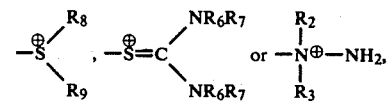

in which formulae above n is 0 or 1, each of R$_2$ and R$_3$ independently is unsubstituted or substituted C$_1$–C$_6$alkyl, R$_4$ is unsubstituted or substituted C$_1$–C$_6$alkyl, C$_3$–C$_7$cycloalkyl or the NR$_6$R$_7$ group, R$_5$ is alkyl, each of R$_6$ and R$_7$ independently is hydrogen or unsubstituted or substituted alkyl, each of R$_8$ and R$_9$ independently is an unsubstituted or substituted alkyl or aralkyl radical, m is an integer from 1 to 6, A completes an aromatic 5- or 7-membered nitrogen-containing heterocyclic ring system which may contain one or two additional nitrogen atoms as ring members and which may carry different substituents, and B completes a saturated 5- or 7-membered nitrogen-containing heterocyclic ring system which may additionally contain 1 or 2 nitrogen, oxygen and/or sulfur atoms as ring members and which may carry different additional substituents, and A⊖ is an inorganic or organic anion, w has the same value as v with respect to monovalent anions A⊖ and is ≦v with respect to ployvalent anions, and Aw⊖ must balance the positive charge, with the proviso that, if v is ≠1, the radicals R can be the same or different, and that the phthalocyanine ring system can contain additional water-solubilising groups, e.g. anionic groups such as sulfo groups, and that all substituents are attached to the phenyl nuclei of the phthalocyanine ring system.

5. A composition of claim 2 which contains a phthalocyanine of the formula

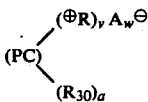

or a mixture of said phthalocyanines, wherein PC, ⊕R, v, A⊖ and w are as defined in claim 4, R$_{30}$ is a non-ionic substituent, preferably a fluorine, chlorine, bromine or iodine atom or cyano, and a is any number from 0.1 to 4, with the radicals R$_{30}$ present in the molecule being the same or different.

6. A composition of claim 2 which contains a phthalocyanine of the formula

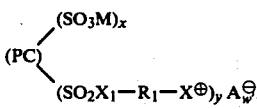

wherein PC is the unsubstituted zinc or aluminum phthalocyanine ring system, $R_1$ is unbranched or branched alkylene of 1 to 8 carbon atoms or 1,3- or 1,4-phenylene, $X_1$ is NH or N-alkyl, $X^\oplus$ is the group of the formula

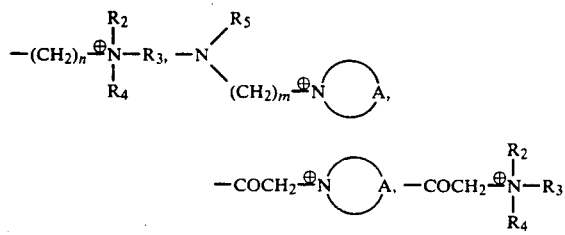

and, if $R_1$ is alkylene, is also a group of the formula

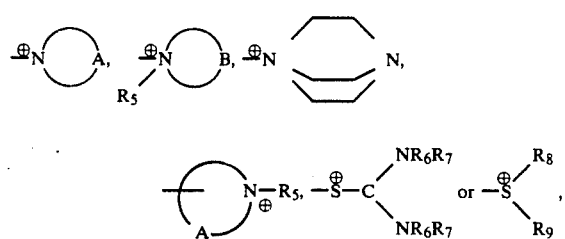

in which the formulae above n is 0 or 1, each of $R_2$ and $R_3$ independently is unsubstituted or substituted $C_1$–$C_6$ alkyl, $R_4$ is unsubstituted or substituted $C_1$–$C_6$alkyl, $C_3$–$C_7$cycloalkyl or the $NR_6R_7$ group, $R_5$ is alkyl, each of $R_6$ and $R_7$ independently is hydrogen or unsubstituted or substituted alkyl, each of $R_8$ and $R_9$ independently is an unsubstituted or substituted alkyl or aralkyl radical, m is an integer from 1 to 6, and A completes an aromatic 5- to 7-membered nitrogen-containing heterocyclic ring system which may contain one or two additional nitrogen atoms as ring system which may contain one or two additional nitrogen atoms as ring members and which may carry different substituents, and $A^\ominus$ is an inorganic or organic anion, M is hydrogen, an alkali metal ion, ammonium ion, or amine salt ion, and the sum of x and Y is from 1 to 4 and $A_w{}'^\ominus$ exactly balances the positive charge of the remaining part of the molecule.

7. A composition containing a phthalocyanine of claim 6 wherein the phthalocyanine ring system further contains a substituent $-(R_{30})_a$, wherein $R_{30}$ is fluoro, chloro, bromo, iodo or cyano and a is any number from 0.1 to 4, with the radicals $R_{30}$ in the molecule being the same or different.

8. A composition of claim 4 which contains a phthalocyanine of the formula $$(PC) \{-(SO_2NHR_1{}'-X'^\oplus \ A'^\ominus)_v$$

wherein $R_1'$ is alkylene of 2 to 6 carbon atoms, v is any number from 1 to 4, $X'^\oplus$ is a group of the formula

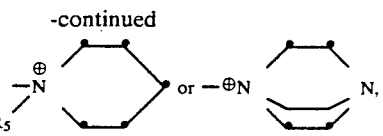

wherein each of $R_2$ and $R_3$ independently is $C_1$–$C_4$alkyl which is unsubstituted or substituted by hydroxyl, cyano, halogen or phenyl, $R_4$ has the meaning of $R_2$ and can additionally be cyclohexyl or the amino group, $R_5$ is $C_1$–$C_4$alkyl, $R_{10}$ is $C_1$–$C_4$alkyl or $C_1$–$C_4$alkoxy, halogen, carboxyl, carbalkoxy or hydroxyl, and $A'^\ominus$ is a halide, alkylsulfate or arylsulfonate ion, whilst the radicals $-SO_2NHR_1{}'-X^\oplus \ A^\ominus$ can be the same or different.

9. A composition of claim 7 which contains a phthalocyanine of the formula

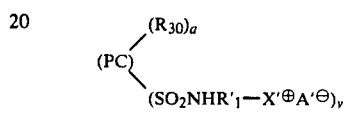

or a mixture of such phthalocyanines, wherein PC is the unsubstituted zinc or aluminum phthalocyanine ring system, $R_1'$ is alkylene of 2 to 6 carbon atoms, v is any number from 1 to 4, $X'^+$ is a group of the formula

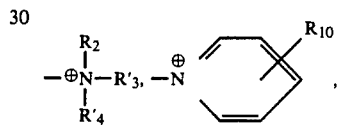

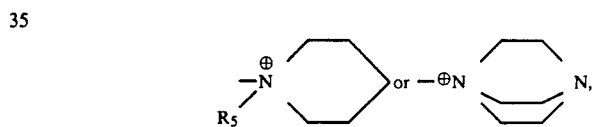

wherein each of $R_2$ and $R_3$ independently is $C_1$–$C_4$alkyl which is unsubstituted or substituted by hydroxyl, cyano, halogen or phenyl $R_4$ has the meaning of $R_2$ and can additionally be cyclohexyl or the amino group, $R_5$ is $C_1$–$C_4$alkyl, $R_{10}$ is $C_1$–$C_4$alkyl or $C_1$–$C_4$alkoxy, halogen, carboxyl, carbalkoxy or hydroxyl, and $A'^-$ is a halide, alkylsulfate or arylsulfonate ion, whilst the radicals $-SO_2NHR_1{}'-X^+ \ A^-$ can be the same or different.

10. A composition of claim 1 which contains 0.0005 to 1.5% by weight of photoactivator, based on the entire composition.

11. A composition of claim 1, wherein the cationic fabric conditioner is a cationic heterocyclic imide or an aliphatic quaternary ammonium compound.

12. A composition of claim 11, wherein the cationic fabric conditioner is a quaternary ammonium salt of the formula

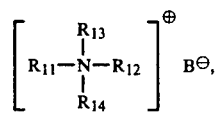

wherein $R_{11}$ is hydrogen or an aliphatic group containing 1 to 22 carbon atoms, $R_{12}$ is an aliphatic group containing 10 to 22 carbon atoms, each of $R_{13}$ and $R_{14}$ independently is $C_1$-$C_4$alkyl, and $B^\ominus$ is an anion, and/or a quaternary imidazolinium salt of the formula

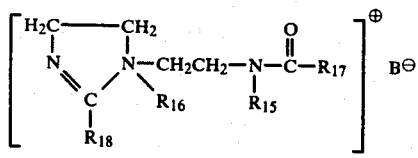

wherein $R_{15}$ is hydrogen or $C_1$-$C_4$alkyl, $R_{16}$ is $C_1$-$C_4$alkyl, $R_{17}$ is $C_1$-$C_{22}$alkyl, $R_{18}$ is hydrogen or $C_1$-$C_{22}$alkyl, and $B^\ominus$ is an anion.

13. A composition of claim 11, wherein the cationic fabric conditioner is a surfactant of the formula

wherein $R_{20}$ is a straight-chain or branched alkenyl or alkyl group of 8 to 22 carbon atoms, and each of the groups $R_{21}$, which can be the same or different, is alkyl or hydroxyalkyl of 1 to 4 carbon atoms or benzyl, with at most one group $R_{21}$ being benzyl, and $B^\ominus$ is an anion, and/or of the formula

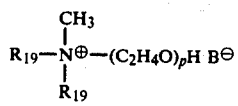

and/or of the formula

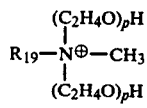

wherein $R_{19}$ is $C_{10}$-$C_{20}$alkyl, p is a number from 1 to 20 and $B^\ominus$ is an anion.

14. A composition of claim 1 which contains 1 to 50% of the cationic fabric conditioner, based on the entire composition.

15. A composition of claim 1 which additionally contains one or more non-ionic surfactants.

16. A composition of claim 1 which additionally contains a softener from the group of zwitter-ionic quaternary ammonium compounds, non-ionic tertiary phosphine oxides, non-ionic tertiary amine oxides, non-ionic oxyethylated alcohols, oxyethylated alcohol sulfates, synthetic anionic $C_8$-$C_{20}$alkylsulfate surfactants and ampholytic synthetic surfactants.

17. A composition of claim 1 which has an alkaline pH value.

18. A method of washing, rinsing and bleaching a fabric, which comprises treating said fabrics in an aqueous liquor that contains a composition of claim 1, while irradiating the fabric in the liquor, or subsequently outside the liquor in the moist state, with visible and/or infra-red light.

19. A method of claim 18, which comprises treating the fabrics in an alkaline liquor.

20. A composition of claim 5, wherein $R_{30}$ is fluorine, chlorine, bromine, iodine or cyano.

21. A composition of either of claims 7 or 9, wherein $R_{30}$ is chlorine and a is a number from 0.5 to 4.

22. A composition of claim 17, which has a pH value of between 7.5 and 10.

23. A method of claim 19, wherein said treating is carried out at a pH value between 7.5 and 10.

24. A composition of claim 15 which additionally contains one or more of a bleaching agent, a fluorescent whitening agent, water and a water-miscible organic solvent.

25. A composition of claim 1, wherein the cationic fabric conditioner is a surfactant, a softener, an antistatic agent, a fluorescent whitening agent or a microbicide.

* * * * *